Figure 1:
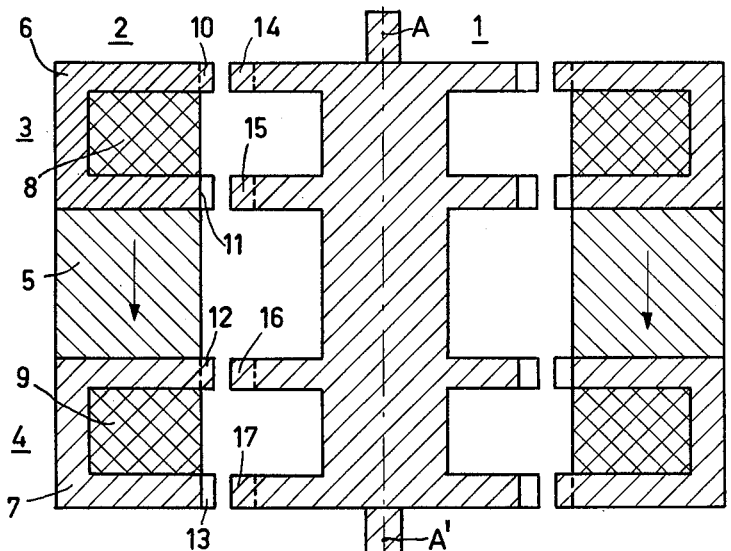

United States Patent [19]

Goddijn

[11] 4,327,299
[45] Apr. 27, 1982

[54] STEPPING MOTOR

[75] Inventor: Bernardus H. A. Goddijn, Eindhoven, Netherlands

[73] Assignee: U.S. Philips Corporation, New York, N.Y.

[21] Appl. No.: 152,079

[22] Filed: May 21, 1980

[30] Foreign Application Priority Data

Jun. 20, 1979 [NL] Netherlands ............ 7904816

[51] Int. Cl.³ .................................. H02K 37/00
[52] U.S. Cl. ................................ 310/49 R; 310/112
[58] Field of Search ............ 310/49, 112, 165; 318/696

[56] References Cited

U.S. PATENT DOCUMENTS 3,549,918  5/1969  Groymans .................... 310/49
3,671,841  6/1972  Hoffman ..................... 318/696
4,206,374  6/1980  Goddijn ..................... 310/49 R Primary Examiner—J. D. Miller
Assistant Examiner—D. L. Rebsch
Attorney, Agent, or Firm—Robert S. Smith

[57] ABSTRACT

A stepping motor having a first and a coaxially disposed second annular stator section, which stator sections are axially spaced by a coaxially disposed permanent-magnetic ring. Each stator section terminates on the inner side in two coaxially disposed annular systems of teeth. The systems of teeth of each stator section have been mutually shifted nominally by ½ tooth pitch relative to the rotor toothing and the systems of teeth situated on the outer side relative to the permanent-magnetic ring as well as the systems of teeth situated on the inner side relative to the permanent-magnetic ring exhibit a mutual shift relative to the rotor toothing of nominal ¼ tooth pitch. In this stepping motor stepping-angle errors can be nearly eliminated for a specific energization by selecting the teeth geometries in such a way that the amplitude of the permeances of the air gap between the inner systems of stator teeth and the cooperating rotor toothing as a function of the rotor position is smaller than the amplitude of the permeance of the air gap between the outer systems of stator teeth and the cooperating rotor toothing as a function of the rotor position.

4 Claims, 8 Drawing Figures

STEPPING MOTOR

The invention relates to a stepping motor having a stator which at least comprises a first annular stator section with an annular coil and a magnetically conductive enclosure surrounding the annular coil. The enclosure terminates in a first and a second annular system of teeth. A second annular stator section with an annular coil and a magnetically conductive enclosure surrounds the annular coil, which enclosure terminates third and fourth annular system teeth, and an axially magnetized and annular permanent-magnetic member, which is disposed between the two stator sections coaxially with said stator sections. The second and the third annular system of teeth adjoining said permanent-magnetic member, and a rotor with a toothing which cooperates with the first, the second, the third and the fourth system of teeth. The first system of teeth and the second system of teeth mutually making a nominal electromagnetic angle of 180° relative to the rotor toothing, the third and the fourth system of teeth mutually making a nominal electromagnetic angle of 180° relative to the rotor toothing. The first and the fourth system of teeth mutually making a nominal electromagnetic angle of 90° relative to the rotor toothing, and the second and the third system of teeth mutually making a nominal electromagnetic angle of 90° relative to the rotor toothing.

Such a stepping motor is known from Netherlands Patent Application No. 7701510, which has been laid open to public inspection. Such a motor is especially suitable for realizing very small stepping angles, for example 1.8°. Said Application states that differences in the permeances of the paths from the permanent-magnetic ring to the first and the second system of teeth as well as in that to the third and the fourth system of teeth give rise to an asymmetrical torque, i.e. unequal torques during the various energizing phases. A number of methods are proposed in order to eliminate these inequalities of said paths.

It is found that equalizing said permeances is very difficult in practice. In addition, it is found that said asymmetrical torque is attended by stepping angle errors, which is far more annoying that the asymmetry of said torques.

It is the object of the invention to provide a motor of the type mentioned in the preamble in which stepping angle errors are greatly eliminated.

To this end the invention is characterized in that, in order to reduce stepping angle errors for one specific energization, the geometry of the teeth of the second and the third system of stator teeth in relation to the teeth of the rotor toothing which cooperate therewith deviates from the geometry of the teeth of the first and the fourth system of the teeth in relation to the teeth of the rotor toothing which cooperate therewith. This deviation results in an amplitude of the permeance of the air gap between the teeth of the second and the third system of stator teeth and the rotor toothing cooperating therewhich is a function of the rotor position and is at least 1% smaller than the amplitude of the permeance of the air gap between the teeth of the first and the fourth system of stator teeth and the rotor toothing cooperating therewith as a function of the rotor position. The geometries of the second and the third system of teeth being mutually identical and said geometries of the first and the fourth system of teeth also being mutually identical.

In this respect an electromagnetic angle of 360° is to be understood to mean a displacement of the rotor relative to the stator equal to the tooth pitch, i.e. the center-to-center distance of said teeth. For a 1.8° stepping motor, i.e. a stepping motor whose rotor advances 1.8° per step and 7.2° per four-step cycle, 360 electromagnetic degrees therefore correspond to a 7.2 geometrical degrees.

The invention is based on the recognition that the inequality in permeance gives rise to a detent torque, i.e. the torque in the non-energized condition which in conjunction with the torque determined by the energization gives rise unequal torques in the four different energising phases and to unequal stepping angles between the stable rotor positions corresponding to the four energising phases, and that for eliminating the stepping angle errors it is not necessary to eliminate said unequality in permeances but that, by reducing the amplitude of the rotor-position dependent permeances of the air gaps between the second and the third system of stator teeth and the rotor toothing relative to the amplitude of the rotor-position dependent permances of the air gaps between the first and the fourth system of stator teeth and the rotor toothing, it is possible to eliminate these stepping angle errors without equalizing the permeances of these paths. In this respect it is to be noted that the reduction of these permances of said air gaps does not correspond to the equalization of the amplitude of the overall permeance functions of said path plus the corresponding air gaps.

Figure 2:
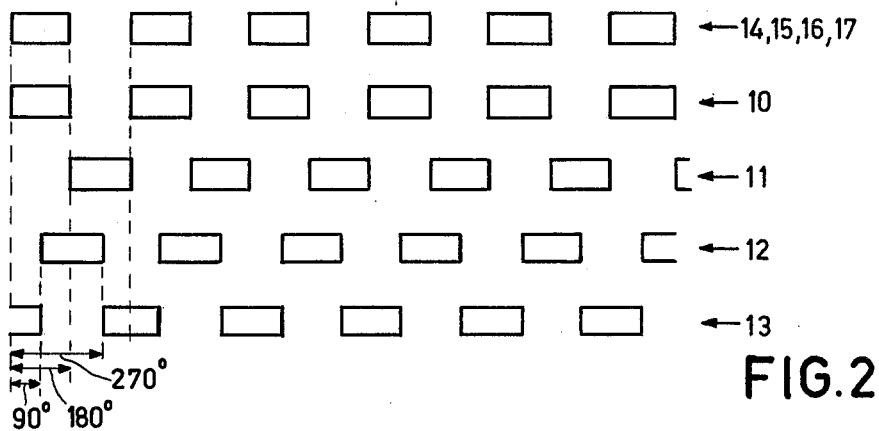
Figure 3:
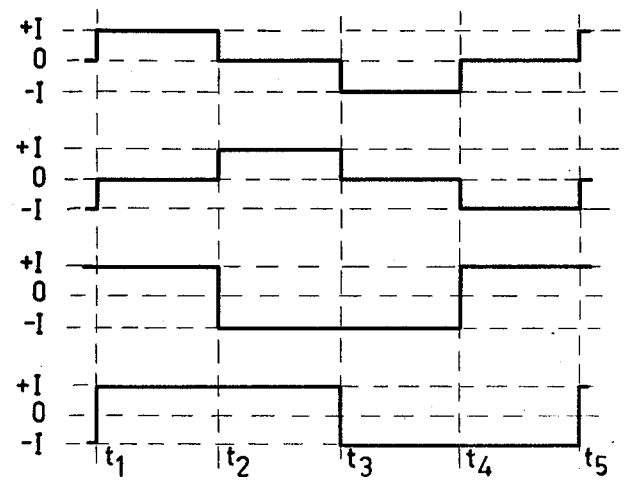

The invention will be described in more detail with reference to the drawing, in which FIG. 1 is a cross-section of a stepping motor to which the invention may be applied, FIG. 2 schematically represents the mutual positions of the stator and the rotor toothing, FIG. 3 shows a number of diagrams in order to illustrate the energization of a motor in accordance with FIG. 1.

Figure 4:
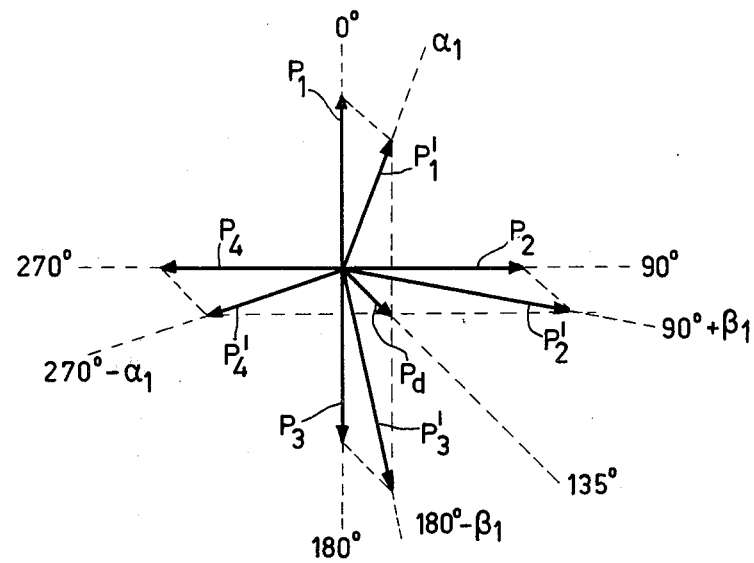
Figure 5:
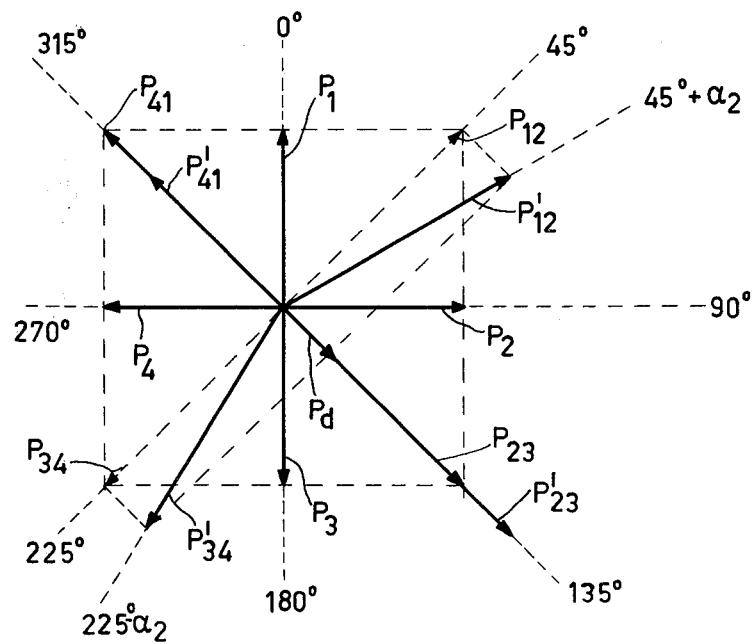
Figures 6, 7:
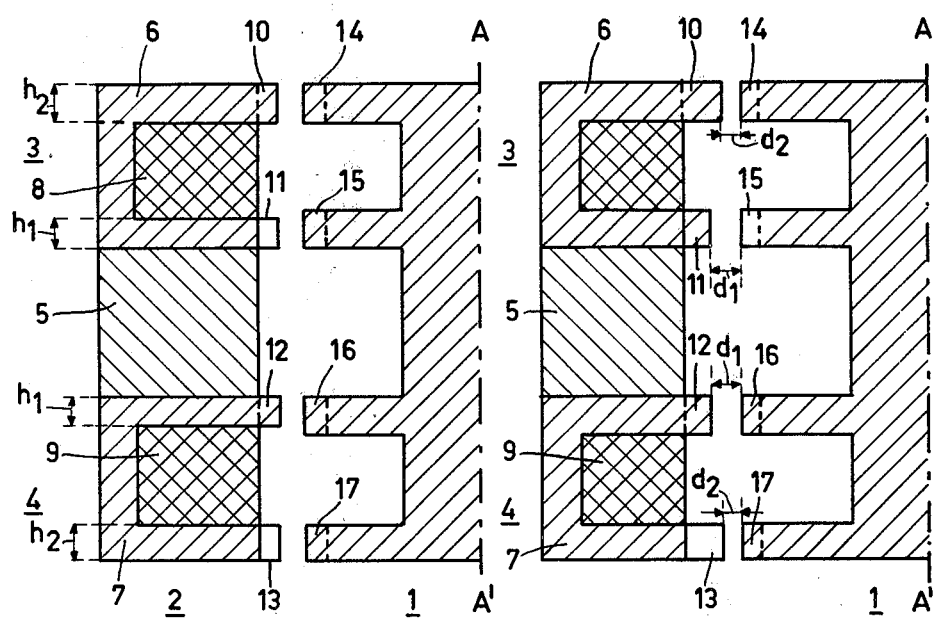
Figure 8:
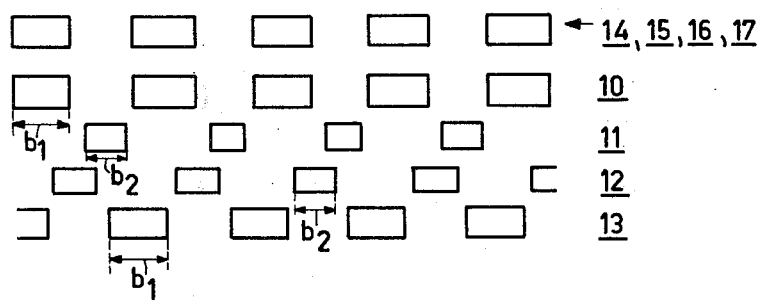

FIG. 4 shows a vector diagram in order to explain the occurrence of stepping angle errors in a motor in accordance with FIG. 1 in the case of single-phase energization, FIG. 5 shows a vector diagram similar to that of FIG. 4 in the case of two-phase energization, FIG. 6 is a cross-section in accordance with FIG. 1 of a first embodiment of the stepping motor in accordance with the invention, FIG. 7 is a cross-section, in accordance with FIG. 1, of a second embodiment of a stepping motor in accordance with the invention, and FIG. 8 represents the relative position of the stator and rotor toothing in a third embodiment of a stepping motor in accordance with the invention.

FIG. 1 shows an axial cross-section of a stepping motor to which the inventive principle may be applied. The stepping motor is substantially rotation-symmetrical about the axis A—A' and comprises a rotor 1 and a stator 2. The stator comprises two coaxial stator sections 3 and 4 with coaxially between them an axially magnetised permanent-magnetic ring 5. Each of the stator sections 3 and 4 comprises a coaxially disposed annular coil 8 or 9 respectively surrounded by a magnetically conducting enclosure 6 and 7 respectively, which on the inner side terminates in two annular systems of teeth 10, 11 and 12, 13 respectively. The rotor 1 is provided with annular systems of teeth 14, 15, 16 and 17 which respectively cooperate with the annular systems of teeth 10, 11, 12 and 13.

FIG. 2 schematically represents the location of the systems of stator teeth 10, 11, 12 and 13 relative to the systems of rotor teeth 14, 15, 16 and 17 respectively. The rotor teeth are axially aligned, so that the upper row in FIG. 2 represents the systems of teeth 14, 15, 16 and 17 (the reverse, namely the stator teeth axially in line and the rotor teeth shifted is also possible). For a specific position of the rotor, the teeth of the system of stator teeth 10 are disposed opposite the rotor teeth as is shown in FIG. 2. The teeth of the system of stator teeth 11 should then be shifted substantially 180° or ½ tooth pitch relative to the teeth of the system of stator teeth 10. The teeth of the system of teeth 12 are shifted 90° or ¼ tooth pitch (or ¾ tooth pitch viewed in the other direction) relative to those of the system of teeth 10 and the teeth of the system of teeth 13 are shifted 270° or ¾ tooth pitch (or ¼ tooth pitch in the other direction) relative to those of the system of teeth 10. The mutual positions of the teeth of the systems of teeth 12 and 13 may also be exactly the other way round.

FIG. 3 shows two possibilities of energizing the motor of FIG. 1. In this Figure the diagrams a and b respectively show the energizing currents for the coils 8 and 9 in the case of single-phase energization (each time only one coil energized) and the diagrams c and d said currents in the case of two-phase energization. A current +I is then directed so that the field produced in the air gap between the systems of teeth 10 and 14 by coil 8 has the same direction as the field produced in said air gap by the permanent-magnetic ring 5 and that the field produced in the air gap between the systems of teeth 12 and 16 by the coil 9 has the same direction as the field produced in said air gap by the permanent-magnetic ring 5.

If at the instant $t_1$ a current +I is applied to coil 8 and coil 9 remains unenergized, the field in the air gap between systems of teeth 10 and 14 will produce a torque which directs the rotor teeth to the teeth of the system of teeth 10 and, provided that the rotor can move, the situation shown in FIG. 2 will be obtained. If at instant $t_2$ coil 9 is energized with a current +I, while coil 8 is unenergized, the field in the air gap between the systems of teeth 12 and 16 will produce a torque which tends to direct the teeth of the systems of teeth 12 opposite those of the system of the teeth 16 and the rotor moves over ¼ tooth pitch. A subsequent energization of coil 8 at instant $t_3$ with a current −I causes the teeth of the system of teeth 11 to be directed towards those of the system of teeth 15 and energization of the coil 8 with a current −I at instant $t_4$ causes the teeth of system of teeth 17 to be directed towards those of the system of teeth 13. Thus the rotor consecutively moves from the position at 0° shown in FIG. 2 to 90°, 180°, 270° and 360°.

In the case of the two-phase energization represented in FIGS. 3c and 3d torques are exerted on the rotor in each time two pairs of systems of teeth. For example, if at instant $t_1$ the coils 8 and 9 are each energized with the current +I the fields in the air gaps between the systems of teeth 10 and 14 and the systems of teeth 12 and 16 produce torques which result in a displacement of the rotor to position which is situated at 45° from the position shown in FIG. 2. By consecutively energizing the coils 8 and 9 in the manner represented in FIGS. 3c and 3d the rotor consecutively moves to positions at 45°, 135°, 225° and 315° in steps of 90°.

FIG. 4 shows a vector diagram in which the direction of the vectors indicates the position to which the rotor is driven for a specific energization of the stator and the length of said vector is a measure of the magnitude of the driving torque. By vector addition of the vectors corresponding to a specific energization, the vector corresponding to the sum of this energization is obtained. The vectors $P_1$, $P_2$, $P_3$ and $P_4$ respectively correspond to single-phase energization of coil 8 with a current +I, coil 9 with a current +I, coil 8 with a current −I and coil 9 with a current −I. The magnitudes of the corresponding torques are equal in the case of an ideal motor.

As in practice the permeances of the paths from the permanent-magnetic ring 5 to the system of teeth 10, 11, 12 and 13 will not be equal, the rotor, if the motor is not energized, will yet exhibit a preferred position because the permeances to the systems of teeth 11 and 12 will be smaller than that to the systems of teeth 10 and 13 and because the stator is symmetrical relative to the permanent-magnetic ring 5 this position will be situated at approximately 135°. The vector which symbolizes this position and the magnitude of the corresponding detent torque is designated $P_d$ in FIG. 4.

In the case of energization of the motor the vectors corresponding to said energization are found by vectorially adding the corresponding vector $P_1$, $P_2$, $P_3$ or $P_4$ to the vector $P_d$. In this respect it is to be noted that theoretically this is not entirely correct, inter alia because the actual torque does not fully correspond to the sum of the ideal torque and the detent torque in the unenergized condition. In the energized condition it may also be assumed that a vector $P_d$ with the same direction as the detent torque but with a different length, owing to inter alia saturations as a result of the energization, is present, which torque $P_d$, which need not have the same length for all energizing conditions, together with the "ideal" torque yields the actual torque. However, it is found that when the motor does not deviate excessively from an ideal motor this method of representation corresponds fairly well to the actual situation.

In FIG. 4 the vectors $P_1'$, $P_2'$, $P_3'$ and $P_4'$ represent the sum of the vectors $P_1$, $P_2$, $P_3$ and $P_4$ and the vector $P_d$. Owing to the presence of the torque $P_d$ the rotor positions for the various single phase energizations deviate from the ideal positions and the stepping angles are not equal to each other. The actual rotor positions for the various single phase energizations are the positions $\alpha_1$, $90°+\beta_1$, $180°-\beta_1$ and $270°-\alpha_1$, so that the stepping angle errors are $\beta_1-\alpha_1$, $2\beta_1$ and $2\alpha_1$. The torques are then no longer equal to each other, but this is considerably less problematic than the occurrence of stepping angle errors.

FIG. 5 shows a similar vector diagram as FIG. 4 but now for the two-phase energization discussed with reference to FIGS. 3c and 3d. In said Figure the vectors $P_{12}$, $P_{23}$, $P_{34}$ and $P_{41}$ represent the torques which would occur in an ideal motor in the case of two-phase energization and which are obtained by combining the vectors $P_1$ and $P_2$, $P_2$ and $P_3$, $P_3$ and $P_4$ and $P_4$ and $P_1$. The vectors $P_{12}'$, $P_{23}'$, $P_{34}'$ and $P_{41}'$ represent the actual torques, which vectors are obtained by vectorial addition of the vectors $P_{12}$, $P_{23}$, $P_{34}$ and $P_{41}$ respectively and the vector $P_d$. The rotor positions corresponding to the vectors $P_{41}'$ and $P_{23}'$ then appear to be unchanged relative to the positions of the vectors $P_{41}$ and $P_{23}$, while the rotor positions corresponding to the vectors $P_{12}'$ and $P_{34}'$ exhibit an error $\alpha_2$ in the angle. In this case the magnitudes of the torques are not equal to each other.

In accordance with the invention said stepping angle error can largely be eliminated at nominal energization by reducing the amplitude of the permeance function of the air gap between the inner systems of stator teeth 11 and 12 respectively and the rotor toothing 15 and 16 respectively relative to the amplitude of the permeance function of the air gap between the outer system of stator teeth 10 and 13 respectively and the rotor toothing 14 and 17 respectively, which results in an increase of the torques on the outer systems of teeth relative to the torques on the inner systems of teeth. As the torques do not only depend on the permeances but also on the energizing currents in the coils 8 and 9, a correction in order to eliminate stepping angle errors is valid only for one specific nominal energizing current. The required correction to said permeances may be determined by experiment or via computations.

There are several ways of reducing the permeances of the air gaps between the inner systems of teeth and the rotor relative to the permeances of the air gaps between the outer systems of teeth and the rotor. FIGS. 6, 7 and 8 show three possibilities.

FIG. 6 shows one half of the cross-section of FIG. 1 in which the teeth on the system of teeth 10 and 13 have an axial height $h_1$ and those of the systems of teeth 11 and 12 an axial height $h_2$. By selecting $h_1$ smaller than $h_2$ the effect in accordance with the invention can be obtained. It is evident that these unequal teeth heights may also be introduced in the rotor instead of in the stator, or in both.

FIG. 7 shows a similar cross-section as that of FIG. 6 but with equal heights of the stator teeth. In this embodiment the distance from the teeth of the systems of stator teeth 10 and 13 to the teeth of the systems of rotor teeth 14 and 17 is $d_2$, which distance is smaller than the distance $d_1$ from the teeth of the systems of stator teeth 11 and 12 to the teeth of systems of rotor teeth 15 and 16.

FIG. 8 in a similar way as FIG. 2 shows the mutual location of the teeth of the systems of stator teeth 10, 11, 12 and 13 relative to the systems of rotor teeth 14, 15, 16 and 17 in a stepping motor in accordance with the invention. In this embodiment the tangential width $b_2$ of the teeth of the systems of stator teeth 11 and 12 has been selected to be smaller than the tangential width $b_1$ of the teeth of the systems of stator teeth 10 and 13 in order to obtain the desired difference in permeances. Again it is possible to introduce the inequality in the rotor teeth instead of in the stator teeth.

What is claimed is:

1. A stepping motor having a stator (2) which at least comprises a first annular stator section (3) with an annular coil (8) and a magnetically conductive enclosure (6) surrounding said annular coil, which enclosure terminates in the first (10) and second (11) annular system of teeth, a second annular stator section (4) with an annular coil (9) and a magnetically conductive enclosure (7) surrounding said annular coil, which enclosure terminates in a third (12) and fourth (13) annular system of teeth, and an axially magnetized annular permanent-magnetic member (5), which is disposed between the two stator sections coaxially with said stator sections, the second (11) and the third (12) annular system of teeth adjoining said permanent-magnetic member, and a rotor (2) with a toothing (14, 15, 16, 17) which cooperates with the first, the second, the third, and the fourth system of teeth, the first system of teeth and the second system of teeth mutually making a nominal electromagnetic angle of 180° relative to the rotor toothing, the third and the fourth systems of teeth mutually making a nominal electromagnetic angle of 180° relative to the rotor toothing, the first and the fourth system of teeth mutually making a nominal electromagnetic angle of 90° relative to the rotor toothing, and the second and the third system of teeth mutually making a nominal electromagnetic angle of 90° relative to the rotor toothing, characterized in that, in order to reduce stepping-angle errors for one specific energization, the geometry of the teeth of the second and the third system of stator teeth (11, 12) in relation to the cooperating teeth (15, 16) of the rotor toothing deviates from the geometry of the teeth of the first and the fourth system of teeth (14, 17) in relation to the cooperating teeth (14, 17) of the rotor toothing, in such a way that the amplitude of the permeance of the air gap between the teeth of the second and the third system of stator teeth (11, 12) and the cooperating rotor toothing (15, 16) as a function of the rotor position is at least 1% smaller than the amplitude of the permeance of the air gap between the teeth of the first and the fourth system of stator teeth (11, 13) and the cooperating rotor toothing (14, 17) as a function of the rotor position, said geometries of the second and the third systems of teeth (11, 12) being identical to each other and said geometries of the first and the fourth systems of teeth also being identical to each other.

2. A stepping motor as claimed in claim 1, characterized in that the height in the axial direction of the teeth of the second and the third system of stator teeth and/or the height of the cooperating teeth of the rotor toothing has been selected to be smaller than the height of the teeth of the first and the fourth system of stator teeth and/or the cooperating teeth of the rotor toothing.

3. A stepping motor as claimed in claim 1, characterized in that the radial distance between the teeth of the second and the third system of stator teeth and the cooperating teeth of the rotor toothing is greater than the radial distance between the teeth of the first and the fourth system of stator teeth and the cooperating rotor toothing.

4. A stepping motor as claimed in claim 1, characterized in that the tangential width of the teeth of the second and the third system of stator teeth and/or that width of the cooperating rotor teeth has been selected to be smaller than the width of the teeth of the first and the fourth system of stator teeth and/or the teeth of the rotor toothing cooperating therewith.

* * * * *